US007689923B2

(12) United States Patent (10) Patent No.: US 7,689,923 B2
Massasso et al. (45) Date of Patent: Mar. 30, 2010

(54) FRAMEWORK FOR CREATING USER INTERFACES FOR WEB APPLICATION PROGRAMS

(75) Inventors: Luca Massasso, San Francisco, CA (US); Ralf Kaltenmaier, Sunnyvale, CA (US); Natasha Oka, Campbell, CA (US)

(73) Assignee: SAP AG, Walldorf (DE)

( * ) Notice: Subject to any disclaimer, the term of this patent is extended or adjusted under 35 U.S.C. 154(b) by 1140 days.

(21) Appl. No.: 10/645,525

(22) Filed: Aug. 22, 2003

(65) Prior Publication Data

US 2005/0044490 A1 Feb. 24, 2005

(51) Int. Cl.
G06F 17/30 (2006.01)
G06F 3/00 (2006.01)
G06F 17/00 (2006.01)
(52) U.S. Cl. .................. 715/762; 715/760; 715/749
(58) Field of Classification Search ............ 715/762, 715/749, 760
See application file for complete search history.

(56) References Cited

U.S. PATENT DOCUMENTS 6,771,291 B1 * 8/2004 DiStefano, III ............ 715/762
2001/0044812 A1 * 11/2001 Byrd et al. ................. 707/513
2002/0152245 A1 * 10/2002 McCaskey et al. ......... 707/530

OTHER PUBLICATIONS

Nylander et al., Ubiquitous service access through adapted user interfaces on multiple devices, Jan. 17, 2005, Springer London, pp. 123-133.*
Monfared et al., Implementing a model-based generic user interface for computer integrated manufacturing systems, 1998, Journal of Engineering Manufacture, pp. 501-516.*

* cited by examiner

Primary Examiner—William L Bashore
Assistant Examiner—Jordany Núñez
(74) Attorney, Agent, or Firm—Finnegan, Henderson, Farabow, Garrett & Dunner, LLP (57) ABSTRACT

A framework is disclosed for generating user interfaces for application programs, such as web application programs. The framework may provide a first set of database tables to define screens including tables that describe components, screen layout, component configuration, application model assignment, and/or event handling. The framework may further provide a first set of transactions for maintaining the first set of database tables and hypertext transfer protocol (HTTP) response means for generating the web pages by accessing the first set of database tables.

22 Claims, 5 Drawing Sheets

FRAMEWORK FOR CREATING USER INTERFACES FOR WEB APPLICATION PROGRAMS

FIELD OF THE INVENTION

The present invention relates to a framework for creating user interfaces for application programs, such as web application programs.

BACKGROUND INFORMATION

User Interface or UI programs enable interaction between users and application programs running on computers. There is a wide variety of user interfaces with different approaches in interaction and design.

Modern business applications are usually web based and typically a web browser is used to display and enable one or more web pages utilizing a user interface.

For business applications, web pages can be seen as the union of business data and user interface layout settings. The business data are retrieved for every application from one or more backend systems. There may be different backend systems for different applications, like Supply Chain Management (SCM), Customer Relationship Management (CRM), Financials (FI), etc. The business data are organized in the web page according to the user interface layout settings.

For web pages with dynamic screen content, a server side scripting language is commonly used. The server side scripting language may include, but is not limited to, Java Server Pages (JSP), Active Server Pages (ASP) and/or Business Server Pages (BSP). However, the straightforward use of a server side scripting language will typically result in a solution that fits only the application it was originally intended for, because there is no standard way of treating the user interface layout and the specialized tags provided by a reusable tag library.

SUMMARY OF THE INVENTION

It is an object of the invention to provide an additional abstraction to achieve standardization of a user interface layout and merging it with business data.

In accordance with an embodiment of the invention, a framework is provided for generating a user interface for an application program, such as a web application program. The web application program may have numerous web pages that are displayed by means of a web browser receiving, for example, hypertext transfer protocol (HTTP) responses from a web server. The framework may provide a first set of database tables to define user interface screens including tables that may describe components, screen layout, component configuration, application model assignment, and/or event handling. The framework may further provide a first set of transactions for maintaining the first set of database tables, and may provide HTTP response means for generating the web pages by accessing the first set of database tables.

One or more embodiments of the invention may utilize components to define a reusable screen pattern, which can in turn be utilized to generate a user interface.

One or more embodiments of the invention may also utilize a second set of database tables based upon the first set of database tables. The second set of database tables may be used for customization and personalization of the user interface.

As further disclosed herein, embodiments of the invention are also directed to a system for generating a user interface of a web application program. The system may comprise: a repository of reusable screen components; means for enabling a user to create a web page layout by selecting components from the repository, arranging selected components within the web page, defining interaction between screen components, and defining interaction between screen components and the web application program; and means for storing rendering information of the web page layout to enable the web server to render the web page.

In one or more embodiments, the repository of reusable screen components may include a tray component, a tab-strip component, a tool-bar component, a text area component, a form-box component, a selection-box component, a table-view component, a table-view-for-time-series component, and/or a chart component. Further, the means for storing the rendering information may include means for storing layout settings of the selected components, properties of the selected components, and/or the handling of data represented by the selected components.

Additionally, or alternatively, the means for storing rendering information include data storage means to store variables defining the web page layout. Moreover, in one or more embodiments, the system may further comprise means for retrieving the stored rendering information and generating hypertext mark-up language (HTML) code using the rendering information.

Other embodiments and features are possible. For example, the means for storing rendering information may include data storage means for storing variables defining event handlers assigned to the reusable components. Further, the means for storing rendering information may include data storage means for storing variables defining an application model assignment of the data presented by the reusable components.

Embodiments of the invention are further directed to a computer readable medium and a computer program comprising instructions for generating a user interface according to the methods and features described herein.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, explain the principles of the invention. In the drawings.

DETAILED DESCRIPTION

Reference will now be made in detail to embodiments of the invention, examples of which are illustrated in the accompanying drawings and described herein. Wherever possible, the same reference numbers will be used throughout the drawings to refer to the same or like parts. The exemplary embodiments disclosed herein are intended for purposes of illustration and should not be construed to limit the invention in any manner.

Figure 1:
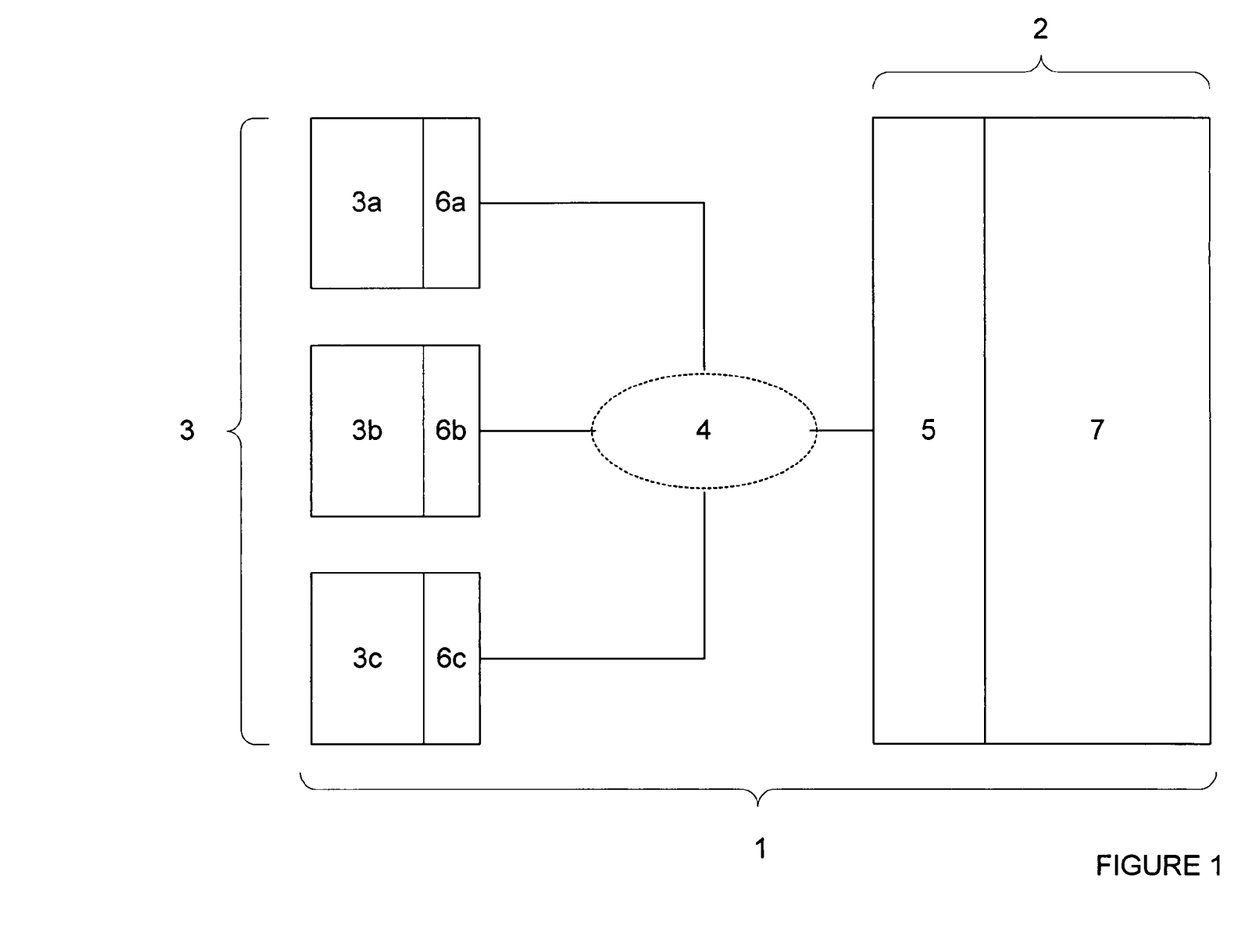
FIG. 1 is an overview diagram of an exemplary system with a user interface.

Embodiments of the invention may be implemented in computer systems or networks. By way of example, FIG. 1 illustrates an exemplary system 1 including a server device 2 and client devices 3a-3c (generally "client devices 3") connected by a network 4. The network 4 may comprise a local area network (LAN), a wide area network (WAN), an intranet, the Internet, and/or any other network. A user interface program 5 allows users to receive information from and input information into the server device 2. Client devices 3 may include Internet browser programs to display the user interface screens and to enable the user to enter input.

An organization may implement the system 1 of FIG. 1 to handle data management in some or all of the organization's business activities. This includes, but is not limited to, applications such as Supply Chain Management (SCM), Customer Relationship Management (CRM), Financials (FI), etc.

Figure 2:
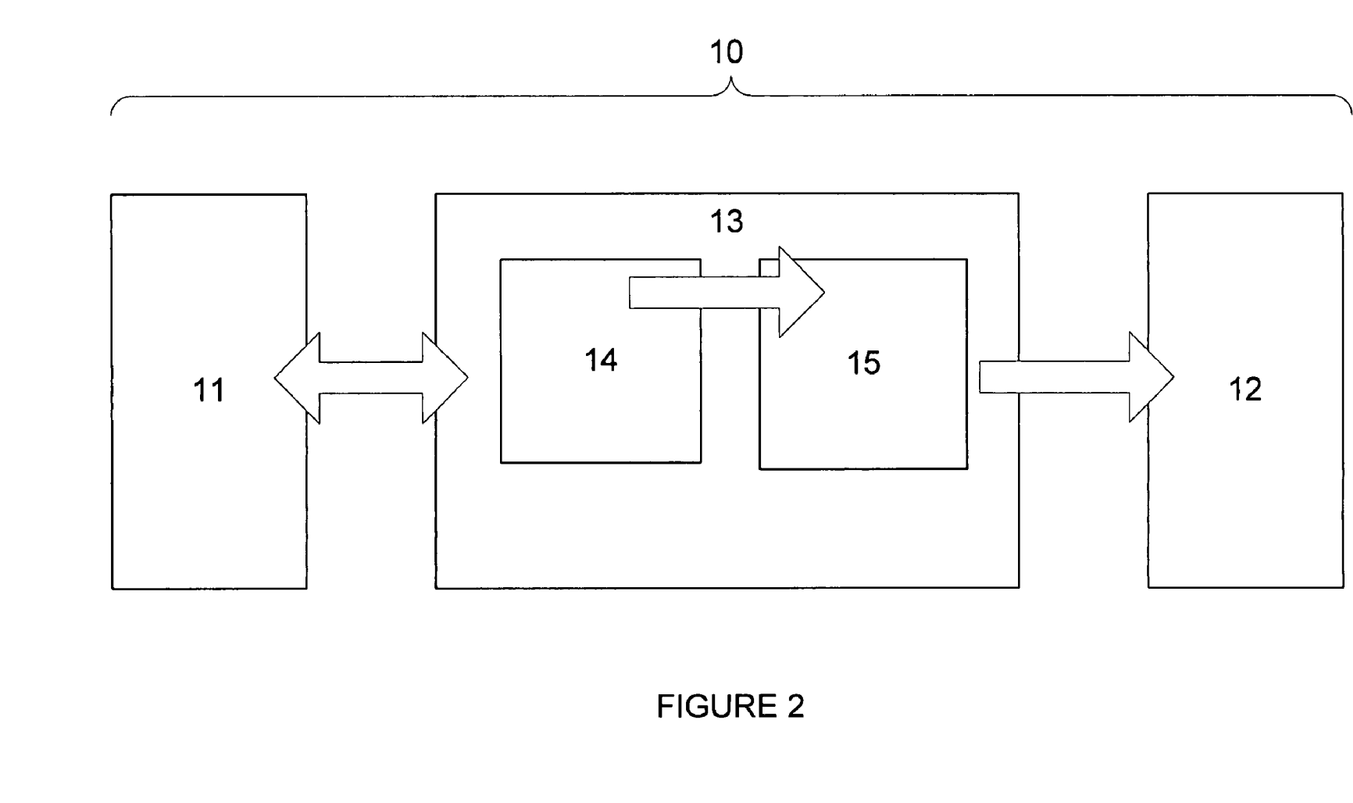
FIG. 2 illustrates an exemplary architecture of a user interface.

FIG. 2 is a block diagram of an exemplary user-interface-architecture 10, consistent with an embodiment of the invention. The architecture 10 may be used to implement the user interface program 5. It may comprise a Model-View-Controller paradigm, a strategy in object oriented programming for separating the presentation of data (VIEW) 11 from the data maintenance (MODEL) 12 and the application flow control (CONTROLLER) 13. The model 12 is the representation of the logical structure of data in the application, the view 11 includes logic for generating web pages and the controller 13 consists of all object classes for communicating between model 12 and view 11. The controller 13 may include a page-rendering controller 14 to provide page-rending information to the view 11, and a page data controller 15 for modifying the data stored in the model 12 according to the input, which may be provided by the user.

Figure 3:
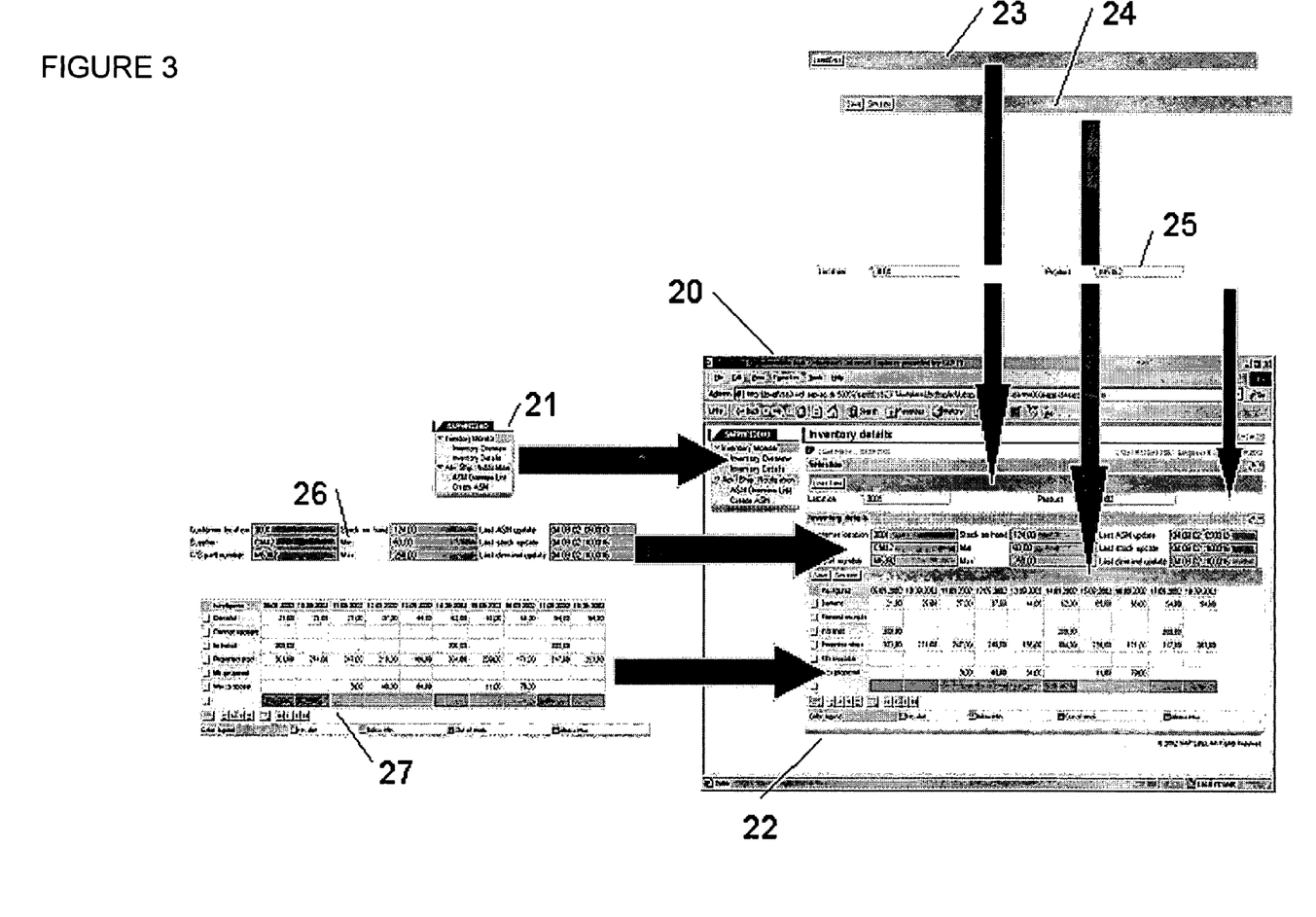
FIG. 3 schematically illustrates an exemplary composition of a user interface.

Referring now to FIG. 3, the composition of an exemplary user interface (UI) is described. Consistent with an embodiment of the invention, a user interface framework may be provided that introduces standardization to the process of creating user interfaces for web applications in order to achieve code reusability. The raw model used for the screen layout may be based on the assumption that a web application, shown, for example, in browser window 20, is made up of a navigation menu (or feature menu) 21, any given number of screen-frames 22 and/or any given number of graphical user interface (GUI) components 23-27 contained in the screen-frames 22. The GUI components 23-27 may include any required number of different components 26-27 that may be configured to display business data and/or any other type of data.

In one embodiment, the user interface framework provides all the components required to set up a screen layout. The components may include a tray component, a tab-strip component, a toolbar component, a text area component, a form-box component, a selection-box component, a chart component, a table-view component, and/or a table-view-for-time-series component. The components may be predefined and stored in a repository for later use. Further, application screens may be designed using these components as screen building blocks.

In FIG. 3, an exemplary composition of a user interface application screen is shown. In a browser window 20, the user interface or UI is composed of a navigation menu 21 and an application screen-frame 22. The application screen-frame 22 is composed of a first toolbar component 23, a second toolbar component 24, a selection-box component 25, a form-box component 26, and a table-view-for-time-series 27. The application screen further includes a title bar, which is set on top of it.

Figure 4:
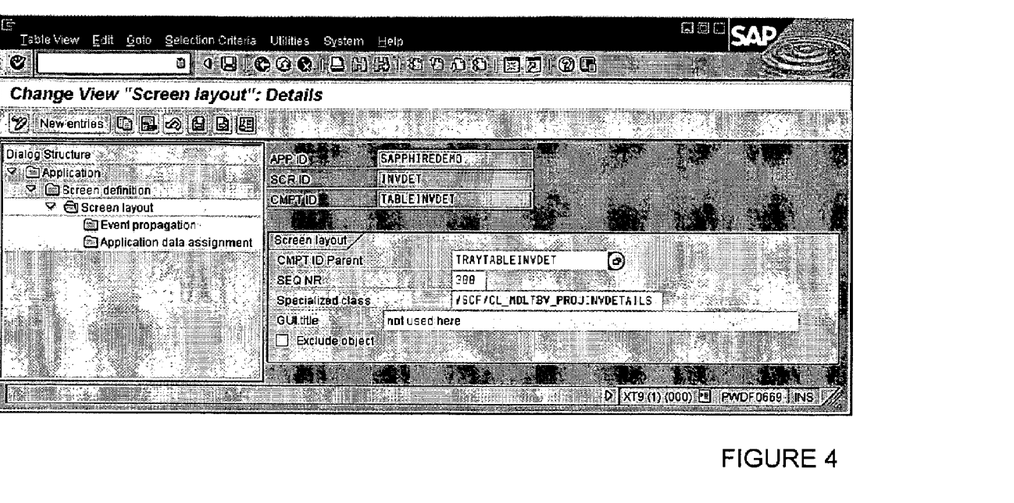
FIG. 4 illustrates a screen shot of an exemplary transaction defining screen layout.
Figure 5:
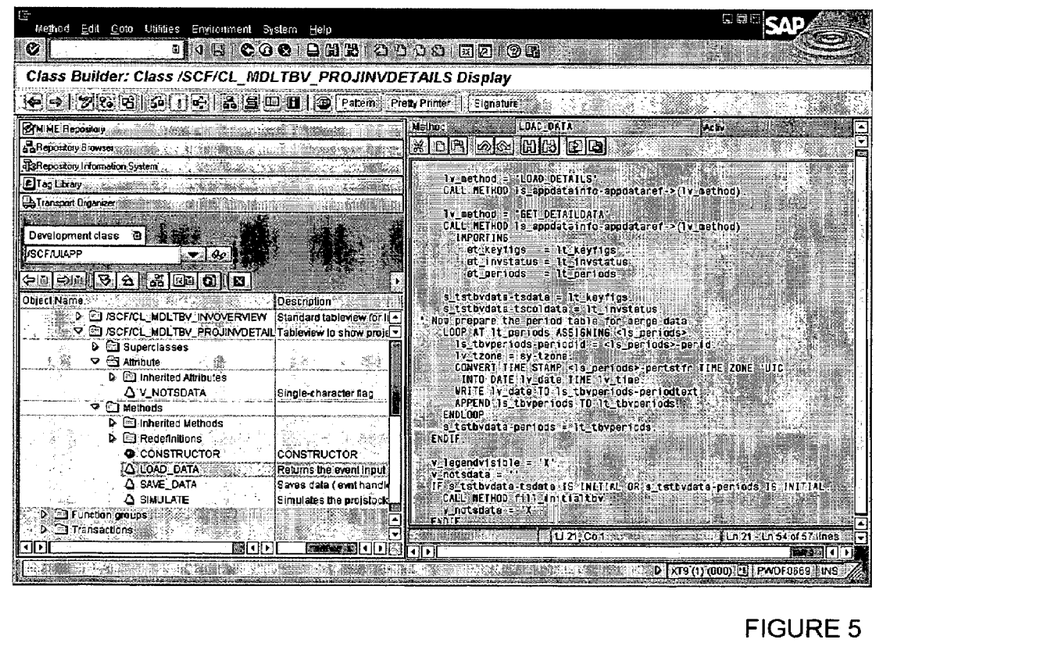
FIG. 5 illustrates a screen shot of an exemplary transaction defining method in specialized classes.

Consistent with an embodiment of the invention, the framework may further provide a set of database tables where the layout settings and the components properties are stored. FIG. 4 shows a screen shot of an exemplary transaction defining screen layout. A set of transactions is used to build the screen by changing the settings and properties stored in the database tables and to establish a relationship to the business data or other data that have to be contained by respective components. FIG. 5 shows a screen shot of exemplary transaction defining methods in specialized classes.

Establishing the relationship between screen components and business data or other data includes generating the required specialized classes by inheriting from super-classes provided by the user interface framework. The user interface framework may provide all the basic characteristics for the correct communication to the scripting language used, which may be BSP, etc., plus all additional features provided by the user interface framework itself. There may be a group of components that do not require this inheriting process, as they may not contain business data and may only require pre-defined content. These components may include the tray component, the tab-strip component, selection-box component and/or the toolbar component. Usually, their content is subject to configuration only. Other components require the inheriting process, as they do contain business data and/or other types of data. These components may include the table-view component, the table-view-for-time-series component, the form-box component, and/or the chart component.

Figure 6:
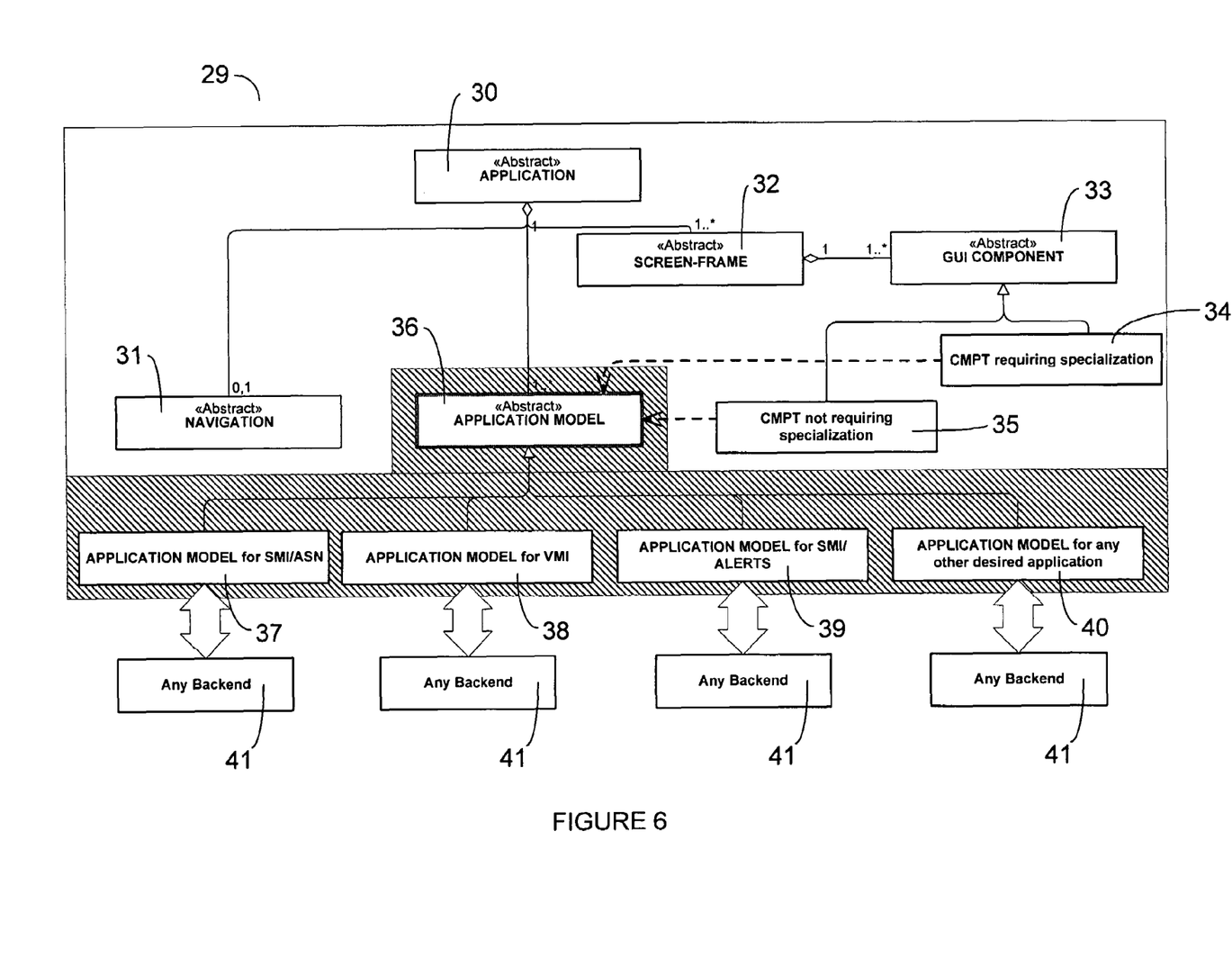
FIG. 6 is a class diagram of an exemplary UI framework.

FIG. 6 shows a class diagram of an exemplary UI framework. The class diagram 29 shows the relationship between an application 30 and its constituents 31-36. Every application 30 may include a navigation menu 31 and at least one screen-frame 32 containing one or more GUI components 33. In one embodiment, two different classes of GUI components may be provided: one that requires specialization 34 and one that does not require specialization 35. Also, every application 30 may include at least one application model 36. Each application model 36 may provide a set of different application models 37-40 for different applications and backend systems 41.

Specializing a required class by inheriting allows creating objects that have the properties of the super-class provided by the framework, and additionally contain the event-handlers required to elaborate the data as a result of a user activity.

For example, in an application screen layout with at least a toolbar component including a SAVE-button and a table-view component containing user editable business data, selecting and clicking the SAVE-button may be required to start the process of saving the user changes in the business data into the respective backend database of the business application.

The set of database tables of the UI framework may define that, when the SAVE-button is pressed, an event SAVETO-DATABASE has to be propagated to the table-view component. The table-view component may perform a particular action or method with a particular name defined by the application developer, when the event SAVETODATABASE has been received. The component may be an object of a class created by the application developer and perform actions programmed by the application developer. The table-view component may include internal attributes that represent the business data in a GUI-like format. The format of the attributes can vary with the component, but usually is a simple structure. After the action has been performed, all the components present in the visible screen may be called and the page rendered accordingly.

Therefore, there is no need to have detailed knowledge about the underlying scripting language used to create the HTML page output. It is only required to have knowledge about the structure and where to put the data in every particular component. The layout is configured separately. The merging of the business data and layout data is done within the UI framework.

Referring now again to FIGS. 4 and 5 and returning to the above-described example, the following is an exemplary process that can be performed for a component based-application:

Model the screen-frames and name them. Choose one name or ID for the application APPID.
Choose the IDs for the screen-frames SCRID and the IDs for the classes, which will contain business data APP-DATAID.
Create the specialized classes for the application, for the application model, and for the components requiring specialization by inheritance.
Set the application specialized classes.
Set the model specialized classes.
Assign the application model object (APPDATAID) to its application ID (APPID).
Set the components specialized classes.
Set the screen layout.
Assign the application model object to the GUI components.
Define all possible fieldnames (e.g., location, product, etc.).
Configure the components.
Define the event propagation.

The UI framework may also support pattern-based screens and/or mixed pattern-components screens. The procedure for creating a pattern may be similar to the one used for creating a component-based screen and can be performed by any application developer. There is no need of a pattern developer profile.

The UI framework, consistent with embodiments of the invention, can provide high flexibility and allow any application developer to use, create, and change patterns, and generate screens accordingly. Both free-style and pattern-based user interfaces are supported.

There is no knowledge required regarding the scripting language used, for example, BSP, JSP, ASP, etc. The reutilization of written code is maximized. The separation of application data and user interface (UI) can be achieved by usage of a Model-View-Controller paradigm, a common criterion followed in the software design community. Under this assumption it is always possible to switch from one user interface to another one, maintaining the application logic intact.

A frequent problem in connection with software products is the code responsibility. In the event of customers reporting bugs, it is very important to quickly identify the responsible developer. Thus, the response time required for the correction can be minimized and the whole maintenance process can be simplified. As a matter of fact, better code and smarter software architectures can signify for remarkable savings in a long-term horizon. Embodiments of the present invention may be implemented bearing this in mind in order to separate the responsibilities of application developers from the responsibilities of UI framework developers.

Moreover, embodiments of the invention may allow a user to change the layout settings at runtime, and to store those changes. Therefore, so-called personalization may be achieved. That is, the capability to change the properties of layout elements (color, element position, default page, etc.) according to the user's preference at runtime and retrieving the web page in that state at the next session logon. For instance, the order of the columns in a table-view can be changed according to the planning practice of a particular procurement department.

A number of embodiments of the invention have been disclosed. Nevertheless, it will be understood that various modifications may be made without departing from the spirit and scope of the invention. Accordingly, other embodiments are within the scope of the following claims.

Furthermore, other embodiments of the invention, including modifications and adaptations of the disclosed embodiments, will be apparent to those skilled in the art from consideration of the specification and practice of the embodiments of the invention disclosed herein. Additionally, although aspects of the present invention are described for being stored in memory, one skilled in the art will appreciate that these aspects can also be stored on other types of computer-readable media, such as secondary storage devices and/or other forms of RAM or ROM. Therefore, it is intended that the specification and examples be considered as exemplary only, with a true scope and spirit of the invention be indicated by the following claims.

What is claimed is:

1. A system for generating a user interface for a web application program, the system comprising:
 a repository of reusable screen components including graphical user interface (GUI) components stored in a computer-readable medium;
 means for enabling a user to create a web page layout by:
  selecting GUI components from the repository,
  arranging the selected GUI components within the web page, the GUI components being assigned to a specialized class or a non-specialized class;
  defining interaction between at least two of the selected GUI components, the interaction including causing a first GUI component to perform an action in response to an event generated by a second GUI component, and
  defining interaction between one or more of the selected GUI components and the web application program, the interaction involving a set of transactions that establish a relationship between properties of the GUI component stored in a database table, business data, and one or more backend systems,
 wherein establishing the relationship by the set of transactions includes generating the specialized class of GUI components by inheriting the properties specific to the one or more selected GUI components from a super class defined by a user interface framework,
 wherein the inheriting causes at least one object of a GUI component assigned to a specialized class inherited from the super class to have the same properties as the super class, and further
 wherein the GUI components assigned to the non-specialized class do not inherit the properties of the super class; and
 means for storing rendering information of the web page layout to enable a web server to render the web page.

2. A system according to claim 1, wherein the repository of reusable screen components includes at least one of a tray component, a tab-strip component, a tool-bar component, a text area component, a form-box component, a selection-box component, a table-view component, a table-view-for-time-series component, and a chart component.

3. A system according to claim 1, wherein the means for storing rendering information include means for storing at least one of layout settings of the selected components, properties of the selected components, and the handling of data represented by the selected components.

4. A system according to claim 1, wherein the means for storing rendering information includes data storage means for storing variables defining the web page layout.

5. A system according to claim 4, further comprising means for retrieving the stored rendering information and generating hypertext mark-up language (HTML) code using the rendering information.

6. A system according to claim 1, wherein the means for storing rendering information includes data storage means for storing variables describing event handlers assigned to the reusable components.

7. A system according to claim 1, wherein the means for storing rendering information includes data storage means for storing variables describing an application model assignment of the data presented by the reusable components.

8. A system for generating a user interface for a web application program, the system comprising:
    a first set of database tables to define screens, the first set of database tables being stored in a computer-readable storage medium and including one or more tables that describe graphical user interface (GUI) screen components, screen layout, component configuration, application model assignment, and event handling;
    a first set of transactions for administrating the first set of database tables, the first set of transactions being stored in a computer-readable storage medium and establishing a relationship between properties of the GUI components, business data and one or more backend systems, wherein GUI components are assigned to a specialized class and a non-specialized class and,
    wherein establishing the relationship by the first set of transactions includes generating the specialized class of GUI components;
    means for generating web pages by accessing the first set of database tables using the first set of transactions, wherein accessing the first set of database tables includes accessing information relating to at least one of the GUI screen components and event handling; and
    a second set of database tables based upon the first set of stored database tables, the second set of stored database tables being stored on a computer-readable storage medium and configured for customization and personalization of the user interface wherein a graphical user interface (GUI) screen component in the second set of database tables inherits properties specific to one or more graphical user interface (GUI) components in the first set of database tables from a super class defined by a user interface framework and applies at least one inherited property from among the inherited properties to the graphical user interface screen component (GUI) in the second set of database tables during the customization and personalization of the user interface,
    wherein the inheriting causes at least one object of a GUI component assigned to a specialized class inherited from the super class to have the property of the super class, and
    wherein GUI components assigned to the non-specialized class do not inherit properties of the super class.

9. A system according to claim 8, wherein the first set of database tables that describe GUI screen components include at least one of a tray component, a tab-strip component, a tool-bar component, a text area component, a form-box component, a selection-box component, a table-view component, a table-view-for-time-series component, and a chart component.

10. A method for generating a user interface for a web application program, the method comprising:
    selecting graphical user interface (GUI) components from a repository of reusable screen components;
    arranging the selected GUI components to create a web page layout the GUI components belonging to a specialized class or a non-specialized class;
    defining interaction between at least two of the selected GUI components, the interaction including causing a first GUI component to perform an action in response to an event generated by a second GUI component;
    defining interaction between one or more of the selected GUI components and the web application program, the interaction involving a set of transactions that establish a relationship between properties of the GUI component stored in a database table, business data, and one or more backend systems, wherein establishing the relationship by the set of transactions includes generating the specialized class of GUI components contain transactional business data and by inheriting properties specific to the one or more selected GUI components from a super class defined by a user interface framework,
    wherein the inheriting causes at least one object of a GUI component in a specialized class inherited from the super class to have the same properties as the super class, and further
    wherein the GUI components belonging to the non-specialized class do not inherit the properties of the super class; and
    storing rendering information of the web page layout to enable rendering of the web page by a web server.

11. A method according to claim 10, wherein the repository of reusable screen components includes at least one of a tray component, a tab-strip component, a tool-bar component, a text area component, a form-box component, a selection-box component, a table-view component, a table-view-for-time-series component, and a chart component.

12. A method according to claim 10, wherein storing the rendering information comprises at least one of storing layout settings of the selected GUI components, storing properties of the selected GUI components, and storing information about the handling of data represented by the selected GUI components.

13. A method according to claim 10, wherein storing rendering information comprises storing variables defining the web page layout.

14. A method according to claim 13, further comprising retrieving the stored rendering information and generating hypertext mark-up language (HTML) code using the rendering information.

15. A method according to claim 10, wherein storing rendering information comprises storing variables defining event handlers assigned to the reusable components.

16. A method according to claim 10, wherein storing rendering information comprises storing variables defining an application model assignment of the data presented by the reusable components.

17. A computer-readable storage medium comprising program code means for performing a method according to any one of the claims 10 to 16 when the program is run on a computer.

18. A computer-readable storage medium that stores executable instructions causing a computer system to provide:
- a repository of reusable screen components including graphical user interface (GUI) components;
- means for enabling a user to create a web page layout by:
  - selecting GUI components from the repository,
  - arranging the selected GUI components within the web page, the GUI components being assigned to a specialized class or a non-specialized class;
  - defining interaction between at least two of the selected GUI components, the interaction including causing a first GUI component to perform an action in response to an event generated by a second GUI component, and
  - defining interaction between one or more of the selected GUI components and the web application program, the interaction involving a set of transactions that establish a relationship between properties of the GUI component stored in a database table, business data, and one or more backend systems,
- wherein establishing the relationship by the set of transactions includes generating the specialized class of GUI components by inheriting the properties specific to the one or more selected GUI components from a super class defined by a user interface framework,
- wherein the inheriting causes at least one object of a GUI component assigned to a specialized class inherited from the super class to have the same properties as the super class, and further
- wherein the GUI components assigned to the non-specialized class do not inherit the properties of the super class; and
- means for storing rendering information of the web page layout to enable a web server to render the web page.

19. A computer-readable storage medium according to claim 18, further comprising instructions operable to cause the computer system to have the repository of reusable screen components include at least one of a tray component, a tab-strip component, a tool-bar component, a text area component, a form-box component, a selection-box component, a table-view component, a table-view-for-time-series component, and a chart component.

20. A computer-readable storage medium according to claim 18, further comprising instructions operable to cause the computer system to provide means for storing the rendering information, including means for storing at least one of layout settings of the selected GUI components, properties of the selected GUI components, and the handling of data represented by the selected GUI components.

21. A computer-readable storage medium according to claim 18, further comprising instructions operable to cause the computer system to provide data storage means for storing variables defining the web page layout.

22. A computer-readable storage medium according to claim 21, further comprising instructions operable to cause the computer system to provide means for retrieving the stored rendering information and generating hypertext markup language (HTML) code using the rendering information.

* * * * *